(12) United States Patent
Dorner et al.

(10) Patent No.: US 7,465,875 B2
(45) Date of Patent: Dec. 16, 2008

(54) SEALING ELEMENT

(75) Inventors: Georg Dorner, Steinhausen/Rot (DE); Volker Friedmann, Biberach (DE); Ralf Schubert, Gutenzell (DE)

(73) Assignee: Liebherr-Hausgerate Ochsenhausen GmbH, Ochsenhausen (DE)

( * ) Notice: Subject to any disclaimer, the term of this patent is extended or adjusted under 35 U.S.C. 154(b) by 369 days.

(21) Appl. No.: 11/250,172

(22) Filed: Oct. 12, 2005

(65) Prior Publication Data

US 2006/0082073 A1 Apr. 20, 2006

(30) Foreign Application Priority Data

Oct. 13, 2004 (DE) .................. 20 2004 015 861 U

(51) Int. Cl.
*H02G 15/02* (2006.01)

(52) U.S. Cl. .................. 174/77 R; 174/79; 174/74 A

(58) Field of Classification Search ............... 174/65 G, 174/74 R, 74 A, 77 R, 151, 152 G
See application file for complete search history.

(56) References Cited

U.S. PATENT DOCUMENTS

| | | | | | |
|---|---|---|---|---|---|
| 2,517,717 | A | * | 8/1950 | Rose | 285/192 |
| 2,897,533 | A | * | 8/1959 | Bull et al. | 16/2.1 |
| 3,424,857 | A | * | 1/1969 | Kipp et al. | 174/153 G |
| 4,675,937 | A | * | 6/1987 | Mitomi | 16/2.1 |
| 4,797,516 | A | * | 1/1989 | Clark et al. | 200/51 R |
| 4,912,287 | A | * | 3/1990 | Ono et al. | 174/153 G |
| 5,238,299 | A | * | 8/1993 | McKinney | 312/223.6 |
| 5,270,487 | A | * | 12/1993 | Sawamura | 174/31 R |
| 5,526,549 | A | * | 6/1996 | Mori et al. | 16/2.1 |
| 5,540,450 | A | * | 7/1996 | Hayashi et al. | 277/607 |
| 5,701,634 | A | * | 12/1997 | Uemura et al. | 16/2.1 |
| 5,981,877 | A | * | 11/1999 | Sakata et al. | 174/153 G |
| 6,211,464 | B1 | * | 4/2001 | Mochizuki et al. | 174/659 |
| 6,822,165 | B2 | * | 11/2004 | Nishimoto | 174/650 |
| 6,825,416 | B2 | * | 11/2004 | Okuhara | 174/668 |
| 6,927,338 | B2 | * | 8/2005 | Shimola et al. | 174/668 |
| 2002/0171207 | A1 | | 11/2002 | Torii et al. | |

FOREIGN PATENT DOCUMENTS

| | | |
|---|---|---|
| DE | 632281 | 4/1963 |
| DE | 1997741 | 6/1968 |
| DE | 1751797 | 7/1968 |
| DE | 8900748 | 5/1989 |
| EP | 0970853 | 1/2000 |

* cited by examiner

*Primary Examiner*—William H Mayo, III
(74) *Attorney, Agent, or Firm*—Alleman Hall McCoy Russell & Tuttle LLP

(57) ABSTRACT

A sealing element for cable leadthroughs or empty conduit leadthroughs is provided. The sealing element has a reception region for one or more cables or empty conduits, the reception region having a first fastening region spaced apart from a second fastening region, with the first fastening region having a diameter projecting beyond the diameter of the regions of the sealing element adjacent to it and with the second fastening region having a resilient peripheral sealing lip.

17 Claims, 1 Drawing Sheet

SEALING ELEMENT

CROSS REFERENCE TO RELATED APPLICATION

This application claims priority to German Utility Model Application Serial No. 20 2004 015 861.2: filed on Oct. 13, 2004, which is hereby incorporated by reference in its entirety for all purposes.

BACKGROUND OF THE INVENTION

The present disclosure relates to a sealing element for cable leadthroughs or empty conduit leadthroughs comprising a reception region for one or more cables or empty conduits.

BACKGROUND AND SUMMARY

The problem frequently exists that cables or empty conduits have to be pulled through openings in walls, for example of a refrigerator or freezer. The cables drawn in serve, for example, for the power supply or generally for the electrical supply, for example, of operating elements of a refrigerator or freezer. In already known solutions, the cables are inserted with slit grommets. The cable lengths must initially be correctly dimensioned in this process. The sealing with putty subsequently takes place, whereby the arrangement is fixedly received in the wall of the appliance. In this process, a sufficient excess length of the cable must be provided since otherwise, for example, the dismantling of the control element panel is not possible or is very difficult or the rear side of the panel is not accessible. If the excess length of the cables is not sufficient, the arrangement must be removed from the opening and sealed with putty again later. The previously known solution is thus relatively inflexible or its handling is awkward.

BRIEF SUMMARY OF THE INVENTION

It is one object of the present disclosure to further develop a sealing element of the type first named such that it can be assembled and dismantled easily and thus permits a higher flexibility.

This object is solved by a sealing element provided for cable leadthroughs or empty conduit leadthroughs having a reception region for one or more cables or empty conduits. In one example, the reception region has a first fastening region and a second fastening region spaced apart from the former, with the diameter of the first fastening region projecting beyond the regions of the sealing element adjacent to it and with the second fastening region having a resilient peripheral sealing lip. A sealing element of this type receives the cable or cables or empty conduits in a receiving region and can be inserted into and also again removed from an opening. It is not necessary to provide cables with excess lengths; they can rather be fixed in the correct length and position. Where necessary, the sealing element can be removed and there is sufficient play available on the dismantling, for example, of a control element panel. The sealing lip of the sealing element in accordance with the present disclosure preferably does not only serve the sealing of pressure differences of the interior space to the environment but, in an advantageous aspect of the present disclosure, also the sealing against moisture. The present disclosure has the advantage that it is not necessary to cut the individual cables to size since, after the insert molding of the cables which is, for example, provided, a positioning or fixing in length has already taken place. Thus, steps can be saved over previously known solutions in this manner.

The term "diameter" is generally understood as the external spacing of two oppositely disposed regions of the fastening regions or other sections of the sealing element. The term is thus not restricted to embodiments circular in cross-section.

It is particularly advantageous when the sealing element has two end regions which are spaced apart in the axial direction of the receiving regions for the cables or the empty conduits and the sealing lip is arranged in an end region and the first fastening region is arranged in the other end region of the sealing element.

Provision can furthermore be made for the sealing lip to be movable into different positions and, in a first position, to enclose an acute angle with the regions of the sealing element adjacent to the sealing lip or to contact them and, in a second, sealing position, to enclose a larger angle (compared with the former), preferably a right angle or a substantially right angle, with the regions of the sealing element adjacent to the sealing lip. Provision can be made in this process for the sealing lip to make contact on the introduction of the sealing element or to enclose an acute angle with the regions of the sealing element adjacent to the sealing lip and to snap into its second position and make seal on the exit from the opening.

Provision is made in a further aspect of the present disclosure for the sealing element to have a middle section between the first fastening region and the sealing lip whose diameter exceeds the diameters of both or one of the regions of the sealing element adjacent to the central section. This middle section can, for example, serve the support of the sealing element in a cable dome. Provision can furthermore be made for the region of lower diameter disposed between the middle section and the sealing lip to have a length corresponding to or exceeding the length of the sealing lip. It is thus possible to completely receive the sealing lip in this free space and thus to move the sealing lip through relatively small openings. In its second, sealing position, the sealing lip can exceed the diameter of the further regions of the sealing element. A particularly good sealing with respect to the wall of, for example, a refrigerator or freezer, surrounding the opening is given in this manner.

The middle section of the sealing element can have a cylindrical surface at least regionally. In a preferred aspect, it has the same diameter or approximately the same diameter as the regions adjacent to the sealing lip with a sealing lip fitted to them. Provision can be made in this position for the first fastening region to represent the region of the largest diameter.

A particular simply designed embodiment of the sealing element results from the fact that it is manufactured by insert molding of the cable or cables or empty conduits. In this case, the sealing element is made in one part and the receiving regions are formed by the regions of the sealing element in which the cables or empty conduits or the cable or empty conduit are/is received. A multi-part embodiment of the sealing element is generally also possible.

To permit an easy pushing of the sealing element through a cable dome, provision can be made for the sealing element to have a surface with low friction resistance, in particular a wax-like surface, at least sectionally.

A particularly simple embodiment results in that the sealing element is made circular in cross-section.

The first fastening region can, for example, be a flange enlarged in diameter over the adjacent region of the sealing element.

The sealing element in accordance with the present disclosure preferably consists of any desired resilient material. PVC (soft), TPE (thermoplastic elastomers), silicone or also natural rubber can be used.

The present disclosure furthermore relates to an appliance or an apparatus, in particular to a refrigerator or freezer having an opening in a wall of the appliance or of the apparatus as well as having a sealing element having one or more (or each) of the features described herein which is received in the opening. Provision can furthermore be made for the wall to have an inner side and an outer side, for a cable dome surrounding the opening to be provided on the inner side and for the sealing element to be received in the opening such that the sealing lip of the sealing element contacts the outer side of the wall and the first fastening region of the sealing element contacts the cable dome. In this position, the sealing lip provides a reliable outward seal. The first fastening region on the oppositely disposed side seals on the inner side at the dome.

It is particularly advantageous for the cable dome to have a first section and a second section adjoining it and diverging in the shape of a funnel and for the first fastening region of the sealing element to contact the second section of the cable dome converging in the shape of a funnel. The first section can be made cylindrical.

BRIEF DESCRIPTION OF THE FIGURES

Further details and advantages of the present disclosure will be explained in more detail with reference to an embodiment shown in the drawings. There are shown.

DETAILED DESCRIPTION

Figure 1:
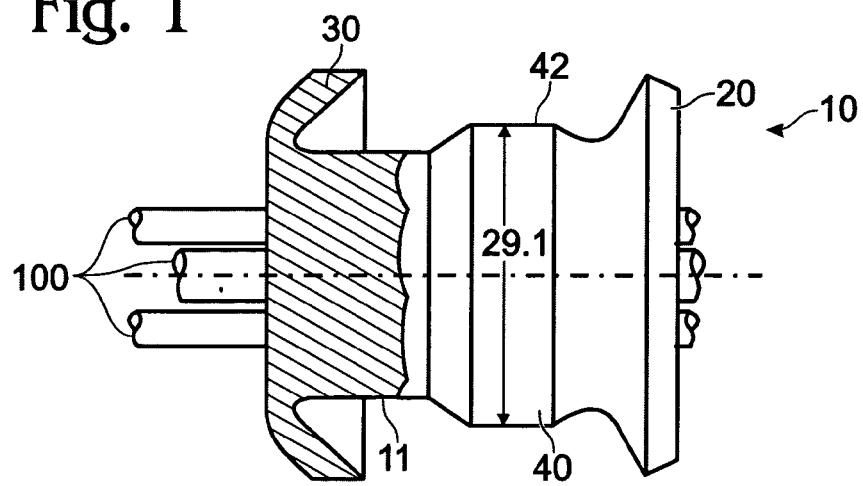
FIG. 1: a side view of the sealing element in accordance with the present disclosure in a partly sectioned state.

FIG. 1 shows the sealing element 10 in accordance with the present disclosure in a partly sectioned state. The resilient, peripheral sealing lip 30 is located in the end region shown on the left; the flange 20 is located in the end region shown on the right. The middle section 40, which has a cylindrical surface 42, is located between these two regions 20, 30. Regions of lower diameter extend at both sides of the middle region 40 and merge into the flange 20 at the one side and into the sealing lip 30 at the other side. One of these regions is marked by the reference numeral 1 in FIG. 1. It serves the reception of the sealing lip 30 when the sealing element 10 is pushed through an opening of lower diameter and the sealing lip 30 contacts the region 11.

The sealing element 10 is manufactured by insert molding of the cables 100 received in the sealing element 10.

In the present case, a three-pole cable with the external diameter 5.7 mm and two two-pole cables with the external diameter of 4.4 mm are insert molded. Other dimensions or another number of cables are naturally also conceivable.

The sealing element 10 is made in one piece. Its reception regions are formed by the substantially cylindrical cut-outs in which the cables 100 lie. The material of the sealing element 10 is, for example, a material having 40 to 45 Shore A which is food safe and odor-free, where possible, and which can have any desired color. The surface of the sealing element or the regions of the sealing element 10 coming into contact with an opening or a cable dome have a wax-like, non-sticky surface since a jamming on the pulling through an opening or a cable dome is unwanted.

Figure 2:
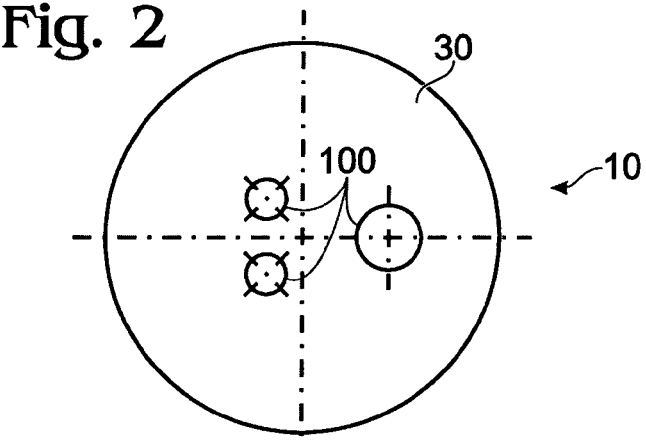
FIG. 2: a cross-sectional view of the sealing element in accordance with FIG. 1.

FIG. 2 shows the sealing element 10 in a cross-sectional representation with a sealing lip 30 and the three received cables 100.

The sealing element in accordance with FIGS. 1 and 2 is made rotationally symmetrical around the central axis of symmetry.

Figure 3:
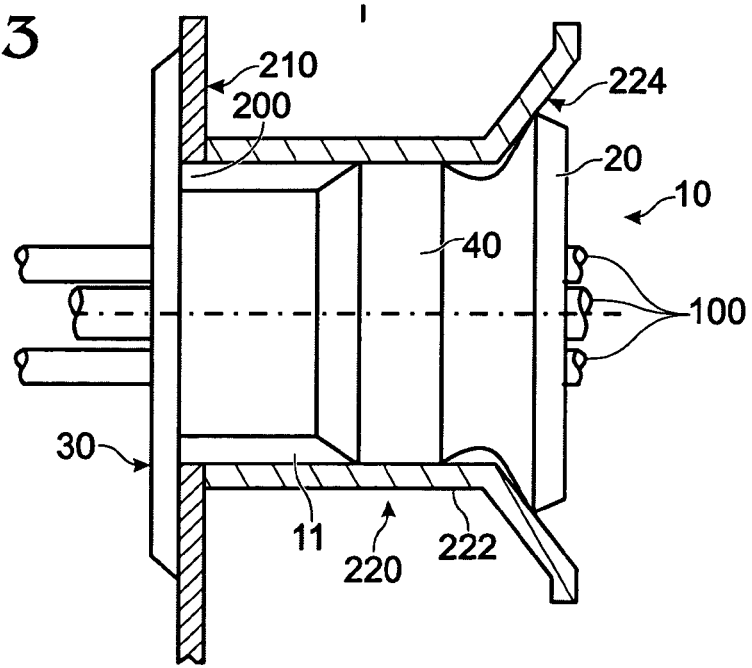
FIG. 3: a side view of the sealing element in accordance with the present disclosure in the inserted state.

FIG. 3 shows the sealing element 10 in a state received in a cable dome 220. The cable dome 220 is adjacent to the rear wall 210 of an appliance, for example of a refrigerator or a freezer or a unit of an appliance of this type. The cable dome 220 surrounds the circular opening 200 in this process. The cable dome 220 is preferably likewise made circular in cross-section. It has a cylindrical section 222 and a section 224 adjoining it and diverging in funnel shape.

The assembly of the sealing element 10 takes place from the right to the left in accordance with FIG. 3. The sealing element 10 is pushed into the cable dome 220 from the right hand side with the sealing lip 30 leading. The cylindrical region 222 of the cable dome 220 has a diameter which approximately corresponds to the external diameter of the cylindrical region 40 or slightly exceeds it. During the assembly process, the sealing lip 30 is received in the region 11 which merges into the middle region 40 after a conically converging transition region. When the end of the dome 220 or of the opening 200 has been reached, the sealing lip 30 snaps over the edge of the dome and then sealingly contacts the outer side of the wall 210. The flange 20 on the oppositely disposed side of the sealing element 10 provides an inward seal in the funnel-shaped or conical region 224 of the dome 220. In this state, the sealing element serves, for example, the sealing of an internal container of a refrigerator or freezer against under-pressure and humidity.

The sealing element 10 in accordance with the present disclosure has the advantage that one or more cables or empty conduits can be guided through an opening 200 with a simultaneous sealing of pressure differences from the internal space to the atmosphere. The cardboard cutting edge can be sealed against moisture.

An axial tolerance compensation is possible due to the biased sealing lips 30.

A further advantage results from the fact that the cables 100 can be fixed in the correct length and position. The sealing element 10 can be removed from the opening 200 and from the cable dome 220 so that, where necessary, the cables 100 with the sealing element 10 can be pulled along when a control element panel should be removed. A high process security thus results in the positioning of the lengths of cable and a leak tightness which is important inter alia on a board change in a service case. In addition to this, the sealing element in accordance with the present disclosure results in an appealing visual appearance over already known solutions.

We claim:

1. A sealing element for cable leadthroughs or empty conduit leadthroughs comprising:
    a reception region for one or more cables or empty conduits, having:
        a first fastening region having a diameter which projects beyond the diameter of the regions of an adjacent sealing element,
        a second fastening region spaced apart from the first fastening region, having a resilient peripheral sealing lip, and
        a middle section disposed between the first fastening region and the sealing lip, a diameter of the middle section exceeding one or both diameters of regions of the sealing element adjacent to the middle section; wherein a region of lower diameter disposed between the middle section and the sealing lip has a length which corresponds to or exceeds a length of the sealing lip; and wherein the sealing element is manufactured by insert molding of the cables or cable or of the empty conduit.

2. A sealing element in accordance with claim 1, wherein the sealing element has two end regions spaced apart in an axial direction of the reception regions for the cables or the empty conduits and wherein the sealing lip is arranged in an end region and the first fastening region is arranged in another end region of the sealing element.

3. A sealing element in accordance with claim 1, wherein the sealing lip is movable into different positions and, in a first position, encloses an acute angle with the regions of the sealing element adjacent to the sealing lip or contacts them and, in a second, sealing position, encloses a second angle larger than the acute angle, with the regions of the sealing element adjacent to the sealing lip.

4. A sealing element in accordance with claim 3, wherein a diameter of the sealing lip in its second, sealing position exceeds a diameter of further regions of the sealing element.

5. A sealing element in accordance with claim 3 wherein the second angle is preferably a substantially right angle.

6. A sealing element in accordance with claim 1, wherein the middle section has a cylindrical surface at least regionally.

7. A sealing element in accordance with claim 1, wherein the sealing element has a surface with low friction resistance.

8. A sealing element in accordance with claim 7 wherein said surface includes a wax-like surface, at least regionally.

9. A sealing element in accordance with claim 1, wherein the sealing element is made circular in cross-section.

10. A sealing element in accordance with claim 1, wherein the first fastening region is a flange enlarged in diameter over adjacent regions of the sealing element.

11. A sealing element in accordance with claim 1, wherein the sealing element comprises a resilient material.

12. A sealing element in accordance with claim 11 wherein resilient material includes at least one of PVC, thermoplastic elastomers, silicone, and natural rubber.

13. An appliance or an apparatus having an opening in a wall of the appliance or of the apparatus, and further having a sealing element in accordance with claim 1, which is received in the opening.

14. An appliance or an apparatus in accordance with claim 13, wherein the wall has an inner side and an outer side, a cable dome surrounding the opening is provided on the inner side and the sealing element is received in the opening such that the sealing lip of the sealing element contacts the outer side of the wall and the first fastening region of the sealing element contacts the cable dome.

15. An appliance or an apparatus in accordance with claim 14, wherein the cable dome has a first section and a second section adjoining it and diverging in a funnel shape and wherein the first fastening region of the sealing element contacts the second section of the cable dome diverging in a funnel shape.

16. An appliance or an apparatus in accordance with claim 15, wherein the first section of the cable dome is made cylindrical.

17. An appliance in accordance with claim 13 wherein the appliance is a refrigerator or a freezer.

* * * * *